United States Patent
Schmerling

[15] 3,679,760
[45] July 25, 1972

[54] PREPARATION OF DIARYLALKANES

[72] Inventor: Louis Schmerling, Riverside, Ill.

[73] Assignee: Universal Oil Products Company, Des Plaines, Ill.

[22] Filed: Feb. 22, 1971

[21] Appl. No.: 117,741

[52] U.S. Cl. .........................................................260/668 C
[51] Int. Cl. ....................................C07c 15/12, C07c 15/14
[58] Field of Search ....................................260/668 R, 668 C

[56] References Cited

UNITED STATES PATENTS

| | | | |
|---|---|---|---|
| 3,000,985 | 9/1961 | Schmerling | 260/668 C |
| 3,006,972 | 10/1961 | Fields et al. | 260/668 C |
| 3,109,868 | 11/1963 | Fields et al. | 260/668 C |

*Primary Examiner*—Curtis R. Davis
*Attorney*—James R. Hoatson, Jr. and Raymond H. Nelson

[57] ABSTRACT

Diarylalkanes are prepared by reacting an $\alpha$-haloalkyl-aromatic compound with an aromatic compound in the presence of certain catalysts comprising copper halides at elevated temperatures to prepare the desired products. The reaction is exemplified by reacting benzyl chloride with benzene to form diphenylmethane.

10 Claims, No Drawings

3,679,760

PREPARATION OF DIARYLALKANES

This invention relates to a process for preparing diarylalkanes and is particularly directed to the use of certain compounds such as copper halides to catalyze the reaction.

It has now been discovered that copper halides including both cuprous halides and cupric halides may be utilized to effect the reaction between an α-haloalkylaromatic hydrocarbon with an aromatic compound to prepare diarylalkanes. By utilizing these copper halide catalytic compositions of matter certain disadvantages which are present in the prior art may be overcome. For example, when utilizing a Friedel-Crafts metal halide and particularly an active halide such as aluminum chloride, it is necessary to effect the reaction at subatmospheric temperatures, usually in a range of from about −20° C. to about 0° C. This will, of necessity, entail the use of fairly complicated equipment inasmuch as these subatmospheric temperatures must be maintained by external cooling means, these external cooling means comprising pipes or other heat transfer means, Dry Ice baths, etc. When utilizing relatively inactive Friedel-Crafts metal halides such as zinc chloride, etc., it is necessary to effect the reaction at relative high operating temperature, usually in excess of about 200° C. These temperatures will require the use of heating means in order to maintain the temperature at this relatively high degree. Another complicating factor which is present when utilizing a Friedel-Crafts metal catalyst is that said catalyst will form complexes with the desired product. This then will necessitate the further use of separation means in order to obtain the desired product in a pure state. In contradistinction to this, it has been discovered that the reaction between an α-haloalkylaromatic hydrocarbon and an aromatic compound may be effected in the presence of a catalyst comprising a copper halide. In addition to being able to utilize relatively mild operating conditions, the copper halides do not form complexes with the diarylalkanes and thus the latter may be recovered in a relatively pure state without subjecting the product to a relatively complicated separation stage.

The desired products of the process of this invention, namely, diarylalkanes are utilized in the chemical industry in many ways. For example, diphenylmethane is utilized in organic synthesis and as an intermediate in the preparation of dyes and perfumes. Likewise, o-benzylphenol is used as a disinfectant, while p-benzylphenol is used as an antiseptic and germicide as well as being used as an intermediate for organic synthesis. Yet, another diarylalkane, 1,2-diphenylethane, is also used in organic synthesis.

It is therefore an object of this invention to provide a process for the preparation of diarylalkanes.

A further object of this invention is to provide a process for the preparation of diarylalkanes utilizing certain catalytic compositions of matter which will permit the recovery of the desired compound in a more expedient manner.

In one aspect an embodiment of this invention resides in a process for the preparation of a diarylalkane which comprises reacting an α-haloalkylaromatic compound with an aromatic compound in the presence of a copper halide catalyst at reaction conditions, and recovering the resultant diarylalkane.

A specific embodiment of this invention resides in a process for preparing a diarylalkane which comprises reacting benzyl chloride with benzene in the presence of cupric chloride at a temperature in the range of from about 50° to about 250° C. and a pressure in the range of from about atmospheric to about 100 atmospheres, and recovering the resultant diphenylmethane.

Other objects and embodiments will be found in the following further detailed description of the present invention.

As hereinbefore set forth the present invention is concerned with a process for preparing diarylalkanes, said process being effected by reacting an α-haloalkylaromatic compound with an aromatic compound in the presence of certain catalytic compositions of matter. The reaction is effected under conditions which include an elevated temperature in the range of from about 50° C. to about 250° C. and preferably in a range of from about 100° C. to about 200° C. In addition, another reaction condition involves pressures, said pressures ranging from about atmospheric up to about 100 atmospheres or more. When superatmospheric pressures are employed, said pressure is afforded by the introduction of a substantially inert gas such as nitrogen into the reaction zone, the particular pressure which is used being that which is necessary to maintain a major portion of the reactants in the liquid phase. Another variable which is employed is the amount of reactants, the aromatic compound usually being present in a mol ratio in the range of from about 1:1 up to about 10:1 mols of aromatic compound per mol of α-haloalkylaromatic hydrocarbon.

Examples of suitable α-haloalkylaromatic hydrocarbons which are utilized as one of the starting materials in the process of this invention include, in particular, the chloro- and bromo-substituted compounds such as benzyl chloride, benzyl bromide, α-chloroethylbenzene, α-bromoethylbenzene, α-chloropropylbenzene, α-bromopropylbenzene, 2-chloro-2-phenylpropane, 2-bromo-2-phenylpropane, α-chlorobutylbenzene, α-bromobutylbenzene, 1-chloromethylnaphthalene, 1-bromoethylnaphthalene, 2-chloromethylnaphthalene, 2-bromomethylnaphthalene, 1-(α-chloroethyl)-naphthalene, 1-(α-bromoethyl)naphthalene, 2-(α-chloroethyl)-naphthalene, 2-(α-bromoethyl)naphthalene, etc.

Suitable aromatic compounds which may be reacted with the aforementioned α-haloalkylaromatic hydrocarbons will include benzene, toluene, o-xylene, m-xylene, p-xylene, mesitylene, pseudocumene, hemimellitene, tetramethylbenzene, pentamethylbenzene, ethylbenzene, n-propylbenzene, isopropylbenzene (cumene), 1,2-diethylbenzene, 1,3-diethylbenzene, 1,4-diethylbenzene, naphthalene, 1-methylnaphthalene, 2-methylnaphthalene, 1,2-dimethylnaphthalene, phenol, catechol, resorcinol, hydroquinone, anisole, ethoxybenzene, propoxybenzene, guaiacol, resorcinol mono- and dimethyl ethers, hydroquinone mono- and dimethyl ethers, catechol mono- and diethyl ethers, etc., the only criterion for the aromatic compounds being that it is characterized by the presence of at least one substitutable nuclear hydrogen atom. It is understood that the aforementioned α-haloalkylaromatic hydrocarbons and aromatic compounds are only representative of the class of compounds which may be employed, and that the present invention is not necessarily limited thereto.

The catalytic compositions of matter which are used in the process of this invention comprise copper halides including both cuprous halide and cupric halide, the preferred copper halides comprising cuprous chloride, cupric chloride, cuprous bromide and cupric bromide. It is also contemplated within the scope of this invention that the corresponding fluorides and iodides such as cuprous fluoride, cupric fluoride, cuprous iodide, and cupric iodide may also be used, although not necessarily with equivalent results.

The process of this invention may be effected in any suitable manner and may comprise either a batch or continuous type operation. For example, when a batch type operation is employed, the reactants comprising the α-haloalkylaromatic hydrocarbon and the aromatic compound are placed in an appropriate apparatus along with the copper halide catalyst. If atmospheric pressure is to be employed, the reaction vessel is then heated to a predetermined operating temperature, preferably the reflux temperature of aromatic compounds. After maintaining the reactants in the reaction vessel at this temperature for a reaction time which may range from 0.5 up to about 20 hours or more in duration, heating is discontinued and the vessel allowed to return to room temperature. The reaction mixture is then recovered, separated from the catalyst and subjected to conventional means of purification and separation, said means including washing, drying, extraction, evaporation, fractional distillation, etc., whereby the desired diarylalkane is recovered. Alternatively, if superatmospheric pressures are to be employed in the reaction, the reactants are charged to a pressure vessel such as a rotating autoclave which contains a copper halide catalyst. The autoclave is sealed and a substantially inert gas such as nitrogen is pressed in until the desired operating pressure is reached. The autoclave is then heated to the desired operating temperature and maintained thereat for a predetermined residence time. At the end of this time, heating is discontinued, the autoclave is allowed to return to room temperature and the excess pressure is discharged. The autoclave is opened and the reaction mixture is then treated in a manner similar to that hereinbefore set forth whereby the desired products are separated and recovered.

It is also contemplated within the scope of this invention that the reaction process for obtaining a diarylalkane may be effected in a continuous manner of operation. When such a type of operation is employed, the reactants are continuously charged to the reaction vessel containing the copper halide catalyst, said vessel being maintained at the proper operating conditions of temperature and pressure. After completion of the desired residence time, the reactor effluent is continuously withdrawn and subjected to conventional means of separation whereby the desired diarylalkane is recovered, while any unreacted starting materials comprising the $\alpha$-haloalkylaromatic hydrocarbon and the aromatic compound are recycled to the reaction zone to form a portion of the feed stock. Inasmuch as the catalytic composition of matter is solid in nature, various types of continuous operation may be used. One such type of operation comprises the fixed bed method in which the catalyst is disposed as a fixed bed in the reaction zone and the reactants are passed over said fixed bed in either an upward or downward flow. Another type of operation which may be employed comprises the moving bed type operation in which the catalyst and the reactants are passed through the reaction zone either concurrently or countercurrently to each other, or the slurry type operation in which the catalyst is carried into the reaction zone as a slurry in either or both of the reactants.

Examples of diarylalkanes which may be prepared according to the process of this invention will include diphenylmethane, 1,1-diphenylethane, 1,1-diphenylpropane, 2,2-diphenylpropane, 1,1-diphenylbutane, benzylphenol, benzyltoluene, benzylxylene, phenylnaphthylmethanes, 2-phenyl-2-naphthylpropane, dinaphthylmethane, etc. It is to be further understood that the aforementioned diarylalkanes are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example 60 g. of benzene and 33 g. of benzyl chloride along with 10 g. of cupric chloride were placed in a round bottom flask provided with heating and refluxing means. The flask was heated to a temperature of 90° C. and maintained thereat for a period of 11 hours. At the end of this time, heating was discontinued and the flask allowed to return to room temperature. The product comprising 88 g. was recovered, separated from the catalyst by filtration and analyzed by means of a gas liquid chromatograph, said analysis disclosing the presence of the desired diphenylmethane.

EXAMPLE II

To a round flask provided with heating and refluxing means was charged 60 g. of toluene, 32 g. of benzyl chloride, and 25 g. of cupric chloride. The flask and contents thereof were heated to a temperature of 120° C. and maintained at a temperature in a range of from 120° to 125° C. for a period of 3 hours, hydrogen chloride being rapidly eliminated during the reaction period. At the end of the aforementioned 3 hour period, heating was discontinued and the flask allowed to return to room temperature. The comprising 104 g. was recovered, separated from the catalyst and subjected to distillation under reduced pressure. The distillate and bottoms were subjected to preparative Gas-Liquid Chromatography followed by Nuclear Magnetic Resonance, Infra-red and Mass Spectrometer analysis. The major product was determined by these analyses to be o-benzyltoluene.

EXAMPLE III

In this experiment, 61 g. of m-xylene, 34 g. of benzyl chloride and 10 g. of cupric chloride were placed in a round bottom flask provided with heating and refluxing means. The flask was heated to a temperature of 142° C. and maintained in a range of from 142° to 163°C. for a period of 8 hours. Upon completion of the desired reaction time, heating was discontinued and the flask allowed to return to room temperature. The reaction product comprising 82 g. was separated from the catalyst and subjected to analyses similar to that set forth in Example II above. The major portion of the reaction product was determined to comprise benzylxylenes.

EXAMPLE IV

In this example 60 g. of phenol, 33 g. of benzyl bromide, and 10 g. of cuprous bromide are placed in a round bottom flask provided with heating and refluxing means. The flask is then heated to a temperature of 180° C. and maintained in a range of from about 180° to 185°C. for a period of 8 hours. At the end of this time, heating is discontinued and the flask is allowed to return to room temperature. The product is recovered, separated from the catalyst and subjected to analyses of the type hereinbefore set forth, said analyses disclosing the presence of benzylphenol.

EXAMPLE V

A mixture comprising 60 g. of benzene, 33 g. of $\alpha$-chloroethylbenzene, and 25 g. of cuprous chloride is placed in a round bottom flask which is thereafter heated to a temperature of 90° C. The flask and contents thereof are maintained at this temperature for a period of 12 hours, at the end of which time heating is discontinued. After the flask and contents thereof have returned to room temperature, the reaction product is recovered, separated from the catalyst and subjected to analyses, said analyses disclosing the presence of the desired product comprising 1,1-diphenylethane.

I claim as my invention:

1. A process for the preparation of diarylalkane which comprises reacting an $\alpha$-haloalkylaromatic compound with an aromatic compound in the presence of a copper halide catalyst at reaction conditions, and recovering the resultant diarylalkane.

2. The process as set forth in claim 1 in which said reaction conditions include a temperature in the range of from about 50° C. to about 250° C. and a pressure in the range of from about atmospheric to about 100 atmospheres.

3. The process as set forth in claim 1 in which said copper halide catalyst is cuprous chloride.

4. The process as set forth in claim 1 in which said copper halide catalyst is cupric chloride.

5. The process as set forth in claim 1 in which said copper halide catalyst is cuprous bromide.

6. The process as set forth in claim 1 in which said $\alpha$-haloalkylaromatic compound is benzyl chloride, said aromatic compound is benzene, and said diarylalkane is diphenylmethane.

7. The process as set forth in claim 1 in which said $\alpha$-haloalkylaromatic compound is benzyl chloride, said aromatic compound is toluene, and said diarylalkane is benzyltoluene.

8. The process as set forth in claim 1 in which said $\alpha$-haloalkylaromatic compound is benzyl chloride, said aromatic compound is m-xylene, and said diarylalkane is benzylxylene.

9. The process as set forth in claim 1 in which said $\alpha$-haloalkylaromatic compound is benzyl bromide, said aromatic compound is phenol, and said diarylalkane is benzylphenol.

10. The process as set forth in claim 1 in which said $\alpha$-haloalkylaromatic compound is $\alpha$-chloroethylbenzene, said aromatic compound is benzene, and said diarylalkane is 1,1-diphenylethane.

* * * * *